(12) United States Patent
Binnard et al.

(10) Patent No.: US 8,212,435 B2
(45) Date of Patent: Jul. 3, 2012

(54) HIGH EFFICIENCY VOICE COIL MOTOR

(75) Inventors: Michael B. Binnard, Belmont, CA (US); Jean-Marc Gery, Los Angeles, CA (US)

(73) Assignee: Nikon Corporation, Tokyo (JP)

( * ) Notice: Subject to any disclaimer, the term of this patent is extended or adjusted under 35 U.S.C. 154(b) by 862 days.

(21) Appl. No.: 12/050,669

(22) Filed: Mar. 18, 2008

(65) Prior Publication Data

US 2008/0165450 A1 Jul. 10, 2008

Related U.S. Application Data

(62) Division of application No. 10/908,178, filed on Apr. 29, 2005, now Pat. No. 7,368,838.

(60) Provisional application No. 60/624,243, filed on Nov. 2, 2004.

(51) Int. Cl.
*H02K 33/00* (2006.01)

(52) U.S. Cl. ................................ 310/15; 310/12.16

(58) Field of Classification Search ............... 310/12.16, 310/15, 30; 335/222
See application file for complete search history.

(56) References Cited

U.S. PATENT DOCUMENTS

| | | | |
|---|---|---|---|
| 3,836,801 A | | 9/1974 | Yamashita et al. |
| 4,808,955 A | * | 2/1989 | Godkin et al. ............. 335/222 |
| 5,349,258 A | | 9/1994 | Leupoid et al. |
| 6,104,108 A | * | 8/2000 | Hazelton et al. ........... 310/12.06 |
| 6,160,327 A | * | 12/2000 | Wang .......................... 310/12.02 |
| 6,188,147 B1 | | 2/2001 | Hazelton et al. |
| 6,531,793 B1 | | 3/2003 | Frissen et al. |
| 6,657,204 B2 | * | 12/2003 | Buis et al. ...................... 250/398 |
| 6,713,901 B2 | | 3/2004 | Hassan et al. |
| 6,720,680 B1 | | 4/2004 | Tanaka |
| 6,841,910 B2 | | 1/2005 | Gery |
| 6,936,937 B2 | | 8/2005 | Tu et al. |
| 7,135,792 B2 | * | 11/2006 | Devaney et al. ........... 310/12.25 |
| 2003/0192449 A1 | | 10/2003 | Fiske et al. |
| 2003/0218391 A1 | | 11/2003 | Hirata |
| 2004/0207269 A1 | * | 10/2004 | Johan Hol et al. ............... 310/12 |

OTHER PUBLICATIONS

Leupold, Herbert A., "Approaches to Permanent Magnet Circuit Design", IEEE Transactioins on Magnetics, vol. 29, No. 6, Nov. 1993, pp. 2341-2346.
Strat, Karl J. "Modern Permanent Magnets for Applications in Electro-Technology", Proceedings of the IEEE, vol. 78, No. 6, Jun. 1990, pp. 923-946.
Zhu, Z.Q. et al., "Halbach Permanent Magnet Machines and Applications: A Review", IEE Proc.-Electr. Power Appl. vol. 148, No. 4, Jul. 2001, pp. 299-308.

* cited by examiner

*Primary Examiner* — Burton Mullins
(74) *Attorney, Agent, or Firm* — TI Law Group

(57) ABSTRACT

Methods and apparatus for increasing the efficiency of a voice coil motor (VCM) are disclosed. According to one aspect of the present invention, a cylindrical and radially symmetric VCM includes a plurality of sets of magnets, and a single coil. The plurality of sets of the magnets are each arranged in an array configuration, and cooperate to form a magnetic field. The coil receives current and has a plurality of windings. A first space is defined within the coil, and the plurality of sets of the magnets are arranged such that a first set of the magnets is positioned within the first space and a second set of the magnets is positioned external to the coil.

27 Claims, 10 Drawing Sheets

HIGH EFFICIENCY VOICE COIL MOTOR

CROSS-REFERENCE TO RELATED APPLICATIONS

This patent application is a divisional of U.S. patent application Ser. No. 10/908,178, filed Apr. 29, 2005, which claims the benefit of U.S. provisional patent application 60/624,243, filed Nov. 2, 2004, which are incorporated by reference in their entirety.

BACKGROUND OF THE INVENTION

1. Field of Invention

The present invention relates generally to actuators. More particularly, the present invention relates to a radially symmetric voice coil motor which utilizes a magnet array which includes wedge-shaped cylindrical magnets.

2. Description of the Related Art

For precision instruments such as photolithography machines which are used in semiconductor processing, factors which affect the performance, e.g., accuracy, of the precision instrument generally must be dealt with and, insofar as possible, eliminated. When the performance of a precision instrument such a wafer scanning stage or a reticle scanning stage is adversely affected, products formed using the precision instrument may be improperly formed and, hence, function improperly.

Voice coil motors (VCMs) are often used in lithography machines to enable accurate movement of a wafer scanning stage along one axis. A VCM utilizes a magnetic coil that is placed in a magnetic field. When current is applied to the coil, a force is generated between the coil and the magnetic field predominantly in a single degree of freedom. Small VCMs are capable of generating force in one direction with a relatively high efficiency.

When a VCM is to be used in a system that is sensitive to heat such as a lithography system, excessive heat may cause the accuracy with which a lithography process may be performed to be compromised. In addition, excessive heat may cause any insulating material in coils of a VCM, as well as the copper from which coils are often formed, to melt. The amount of force that may be generated by a VCM is also limited by the amount of current which may be supplied by an amplifier, or by electronics which are used to control the VCM.

Therefore, what is needed is a method and an apparatus for enabling the force generated by a VCM to be increased without significantly increasing the current usage of the VCM or the heat output of the VCM.

BRIEF SUMMARY OF THE INVENTION

The present invention relates to a voice coil motor (VCM) which uses a magnetic circuit which includes magnets with wedge-shaped cross-sections. According to one aspect of the present invention, a cylindrical and radially symmetric VCM includes a plurality of sets of magnets, and a coil. The plurality of sets of the magnets are each arranged in an array configuration, and cooperate to form a magnetic field. The coil receives current and has a plurality of windings. A first space is defined within the coil, and the plurality of sets of the magnets are arranged such that a first set of the magnets is positioned within the first space and a second set of the magnets is positioned external to the coil. The coil is the only coil associated with the VCM which moves within the magnetic field between the two sets of magnets.

In one embodiment, the first set of the magnets includes at least a first magnet that is wedge-shaped. In another embodiment, the VCM also includes a magnetic material that physically couples the first set and the second set to enable a flux path created within the VCM to pass between the first set and the second set.

The use of Halbach arrays of magnets in a VCM generally enables the strength of a magnetic field within the VCM to be increased. By configuring the magnets in Halbach arrays such that at least some of the magnets have a non-rectangular cross-section, e.g., a substantially trapezoidal or triangular cross-section, the strength of the magnetic field in a VCM which includes the Halbach arrays may be further increased, thereby enabling the force generated by the VCM to be increased without significantly increasing the heat produced by the VCM. In some instances, the configuration of the magnets with a non-rectangular cross-section, i.e., the wedge-shaped magnets, is such that a single coil rather than a pair of coils may be used within the VCM.

According to another aspect of the present invention, a VCM includes a first magnet arrangement, a second magnet arrangement, and a coil arrangement. The first magnet arrangement includes at least a first magnet having a cross-section that is approximately rectangular and a second magnet having a cross-section that is non-rectangular relative to a plane. The first magnet is arranged substantially at a center of the first magnet arrangement and the first magnet and the second magnet are arranged to be in contact. The second magnet arrangement includes at least a third magnet having a cross-section that is approximately rectangular and a fourth magnet having a cross-section that is non-rectangular relative to the plane, where the third magnet is arranged substantially at a center of the second magnet arrangement and the third magnet and the fourth magnet are arranged to be in contact. The coil arrangement is at least partially positioned between the first magnet arrangement and the second magnetic arrangement, and moves relative to the first magnet arrangement and the second magnet arrangement within a magnetic field associated with the first magnet arrangement and the second magnet arrangement.

In one embodiment, the VCM also includes at least one plate from a magnetic material that is in physical contact with both the first magnet arrangement and the second magnet arrangement. In another embodiment, the coil arrangement includes a single-phase coil.

According to yet another aspect of the present invention, a VCM includes a first magnet arrangement which includes a first plurality of magnets which each have a cross-section that is non-rectangular. The VCM also includes a second magnet arrangement that includes a second plurality of magnets each having a cross-section that is non-rectangular. The first magnet arrangement and the second magnet arrangement are arranged to cooperate to generate a magnetic field. A coil arrangement of the VCM is at least partially positioned between the first magnet arrangement and the second magnetic arrangement and is arranged to receive current to generate a force between the coil arrangement and the first magnet arrangement and the second magnet arrangement within the magnetic field.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE INVENTION

Typically, when a higher force is to be provided by a voice coil motor (VCM), the current input into the VCM is increased, and, consequently, the heat generated by the VCM is increased. Increasing current requirements is often impractical, and increased heat associated with the operation of a VCM may adversely affect heat-sensitive systems, e.g., lithography equipment.

By increasing the magnetic field within a VCM, i.e., by increasing the strength or the magnitude of the magnetic field within a VCM, a higher force may be generated using the VCM, substantially without increasing the amount of heat generated by the VCM and increasing the amount of current used by the VCM. The magnetic field within a VCM may be increased by utilizing a magnet array in the VCM and, further, by varying the shape of magnets in the magnet array. In one embodiment, the magnet array is a substantially cylindrical wedge Halbach array.

A substantially cylindrical wedge Halbach array is an array of magnets which includes at least one wedge-shaped magnet. A wedge-shaped magnet is generally a magnet which has either a substantially triangular cross-section with respect to at least one plane or a substantially trapezoidal cross-section with respect to at least one plane. When a wedge-shaped magnet has a substantially trapezoidal cross-section with respect to a plane, while two opposite sides of the cross-section are substantially parallel to each other within the plane, the other two sides are not substantially parallel to each other within the plane.

Figure 1:
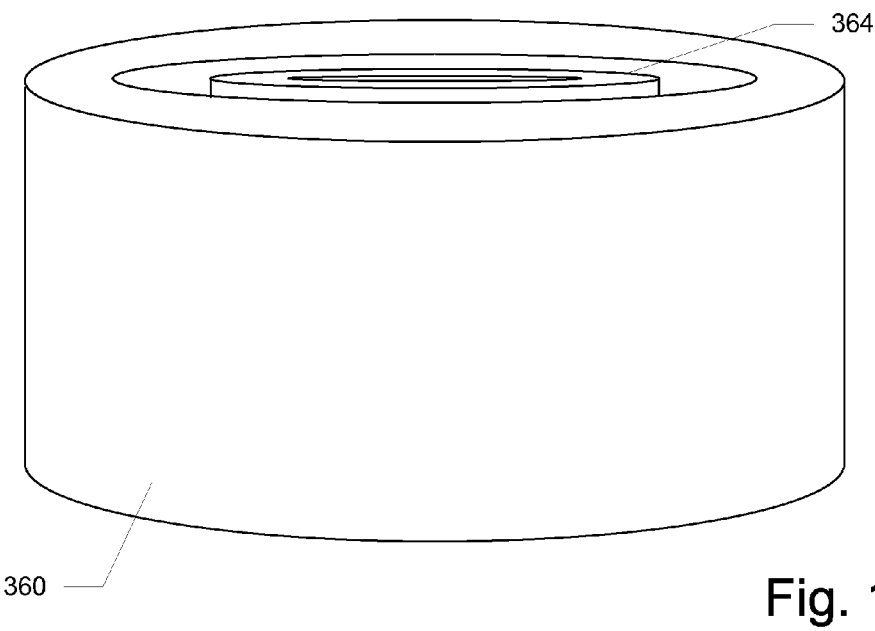
FIG. 1 is a diagrammatic representation of cylindrical Halbach magnet arrays in accordance with an embodiment of the present invention.

A VCM which includes a substantially cylindrical wedge Halbach array may have a variety of different configurations. In general, the wedge-shaped magnets are arranged to form an overall cylindrical Halbach array. As shown in FIG. 1, an outer Halbach magnet array 360 typically has an overall, hollow cylindrical shape or an overall donut shape. However, the individual magnets of magnet array 360 may be wedge-shaped donuts. Similarly, an inner Halbach magnet array 364 also has an overall hollow, cylindrical shape, though the individual magnets of magnet array 364 may be wedge-shaped donuts.

Figure 2:
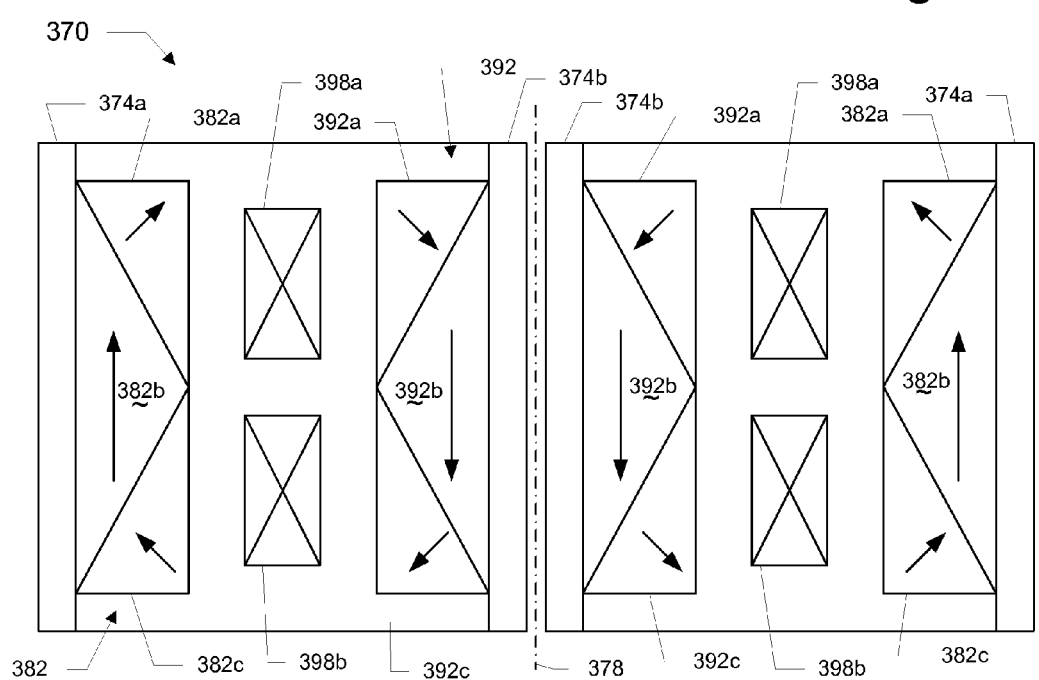
FIG. 2 is a diagrammatic cross-sectional representation of a radially symmetric cylindrical VCM which utilizes a substantially cylindrical wedge Halbach array in accordance with an embodiment of the present invention.

The orientation of wedge-shaped magnets and other magnets within the substantially cylindrical wedge Halbach array may be widely varied. FIG. 2 is a diagrammatic cross-sectional representation of a radially symmetric cylindrical VCM which utilizes a substantially cylindrical wedge Halbach array in accordance with an embodiment of the present invention. A VCM 370, as shown in cross-section, includes non-magnetic hollow cylinders 374a, 374b which are substantially centered about a central axis 378. Alternatively, either or both hollow cylinders 374a, 374b may be formed from a magnetic material.

Magnet arrays 382, 392 are also effectively hollow cylinders that are positioned within VCM 370 about central axis 378 such that coils 398a, 398b, having center lines that are substantially coincident with central axis 378, are positioned between magnet arrays 382, 392. Coils 398a, 398b are such that the turns or windings of coils 398a, 398b effectively define a ring or a donut shape for coils 398a, 398b. Hollow cylinder 374b and magnet array 392 are positioned within the inner area of the ring or the donut shape defined by coils 398a, 398b. As will be understood by those skilled in the art, coils 398a, 398b are generally substantially encased in cooling cans which are filled with coolant. However, for ease of illustration, cooling cans have not been shown.

As shown, coils 398a, 398b are positioned between magnet arrays 382, 392. Coils 398a, 398b move relative to magnet arrays 382, 392 and, hence, within a magnetic field associated with magnet arrays 382, 392 when current is applied. Each magnet array 382, 392 includes a plurality of magnets, i.e., permanent magnets. By way of example, magnet array 382 includes magnets 382a-382c which each have an overall donut shape but each have a substantially non-rectangular, e.g., triangular, cross-section in at least one plane. That is, magnets 382a-c are each substantially wedge-shaped donuts. By shaping magnets 382a-c as wedges, or with wedge-shaped cross sections, the magnetic field associated with VCM 370 may be enhanced. Magnets 392a-c are also each substantially wedge-shaped donuts.

Figure 3:
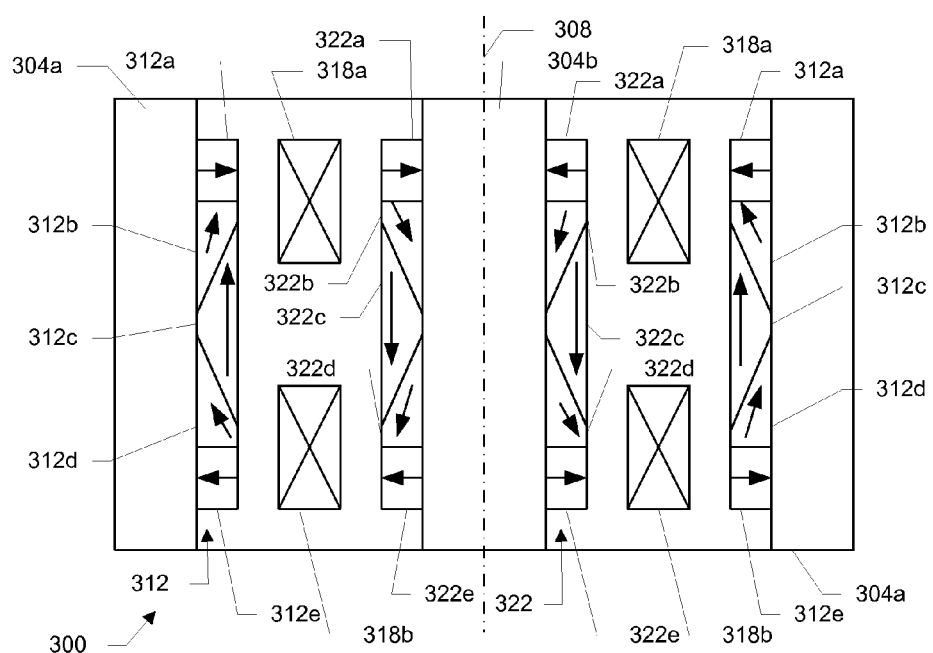
FIG. 3 is a diagrammatic cross-sectional representation of a radially symmetric cylindrical VCM which utilizes a substantially cylindrical wedge Halbach array in accordance with another embodiment of the present invention.
Figure 3:
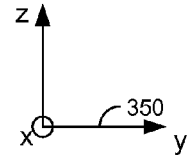

With reference to FIG. 3, a second radially symmetric cylindrical VCM which utilizes a substantially cylindrical wedge Halbach array will be described in accordance with another embodiment of the present invention. A VCM 300, which is shown in cross-section, includes non-magnetic cylinders 304a, 304b which are substantially centered about a central axis 308. It should be appreciated that cylinders 304a, 304b are each effectively a hollow cylinder with a center that is coincident with central axis 308.

Magnet arrays 312, 322 are also arranged as hollow cylinders, and are positioned within VCM 300 such that coils 318a, 318b, which each effectively form a hollow, cylindrical shape with center lines that are substantially coincident with central axis 308, are positioned between magnet arrays 312, 322. Magnet arrays 312, 322 are also centered about central axis 308. Coils 318a, 318b are such that the turns or windings of coils 318a, 318b effectively define a ring or a donut shape for coils 318a, 318b.

Coils 318a, 318b are positioned between magnet arrays 312, 322 and, hence, within a magnetic field associated with magnet arrays 312, 322 when current is applied. Each magnet array 312, 322 includes a plurality of magnets. By way of example, magnet array 312 includes magnets 312a-312e which each have an overall donut shape. Magnets 312a and 312e, which make up the ends of magnet array 312, are substantially block-shaped donuts. That is, magnets 312a, 312e have substantially rectangular, as for example square, cross-sections in at least one plane. Magnets 312b-d are each substantially wedge-shaped donuts, i.e., magnets 312b-d each have a substantially triangular or trapezoidal cross-section in one plane. By shaping magnets 312b-d as wedges, or with wedge-shaped cross sections, the magnetic field associated with VCM 300 may be enhanced. As shown, magnets 322b-d are also each substantially wedge-shaped donuts, while magnets 322a, 322e are substantially block-shaped donuts.

While the use of wedge-shaped magnets in a Halbach array within a VCM improves the efficiency of the VCM, i.e., by increasing the strength of the magnetic field within the VCM, the efficiency of a VCM may further be increased by essentially concentrating a magnetic field near a coil of a VCM. In one embodiment, by altering the orientation of magnets associated with a wedge Halbach array of a VCM such that the use of only a single coil in the VCM is possible, the efficiency of the VCM is further enhanced.

By orienting the magnets in a Halbach array of a VCM such that a magnet with radial magnetization is effectively in the center of the Halbach array, while magnets with longitudinal magnetization are at the ends of the Halbach array, a single coil may be used within the VCM. It should be appreciated that for a Halbach array with a given total magnet height, the height of a single coil is generally greater than or equal to the combined height of two coils used in VCMs, e.g., VCM 300 of FIG. 3, with magnet arrays of the given total magnet height. The use of a single coil enables the magnetic field within a VCM to be substantially concentrated through the coil, thereby further increasing the efficiency of the VCM.

Figure 4:
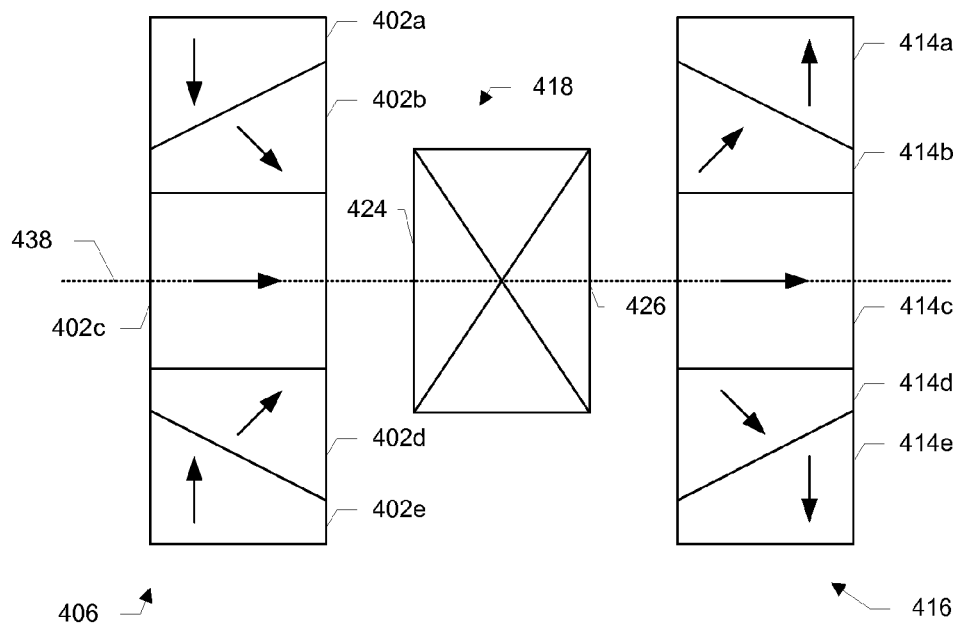
FIG. 4 is a diagrammatic cross-sectional block diagram representation of a portion of a single coil and a portion of two wedge Halbach magnet arrays in accordance with an embodiment of the present invention.

FIG. 4 is a diagrammatic cross-sectional block diagram representation of a portion of a single coil and a portion of two wedge Halbach magnet arrays in accordance with an embodiment of the present invention. Within a VCM, a portion of a coil 418 is positioned such that a first wedge Halbach magnet array 406 is located in a space defined by an inner edge 424 of coil 418 and a second wedge Halbach magnet array 416 is positioned outside an outer edge 426 of coil 418.

Both magnet arrays 406, 416 include wedge magnets, or magnets which have a cross-section that is either approximately triangular or trapezoidal. Magnet array 406 includes wedge magnets 402a, 402b, 402d, 402e, whereas magnet array 416 includes wedge magnets 414a, 414b, 414d, 414e. Magnets 402c, 414c, which are arranged at the center of magnet arrays 406, 416, respectively, are substantially block-shaped, or have approximately rectangular or square cross-sections. Specifically, magnets 402c, 414c are donut-shaped blocks. The orientation of magnets 402a-e within magnet array 406, and the orientation of magnets 414a-e within magnet array 416 are such that a magnetic field is centered approximately along a horizontal centerline 438 of magnet arrays 406, 416. Magnetic field equipotential lines associated with an arrangement of magnet arrays 406, 416 and coil 418 as shown will be described below with respect to FIG. 6.

Figure 5A:
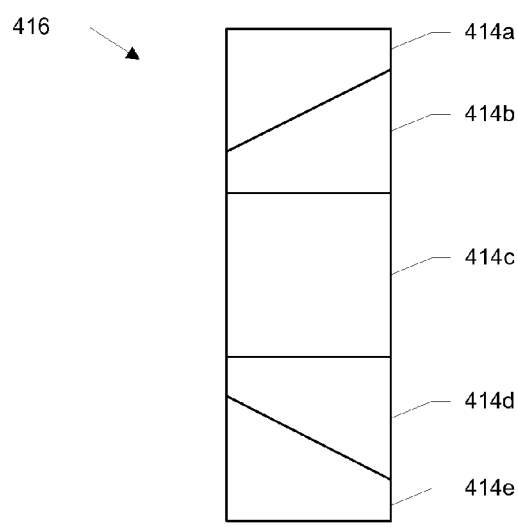
FIG. 5a is a block diagram representation of a magnet array, e.g., magnet array 416 of FIG. 4, in accordance with an embodiment of the present invention.
Figure 5A:
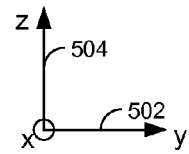
Figure 5B:
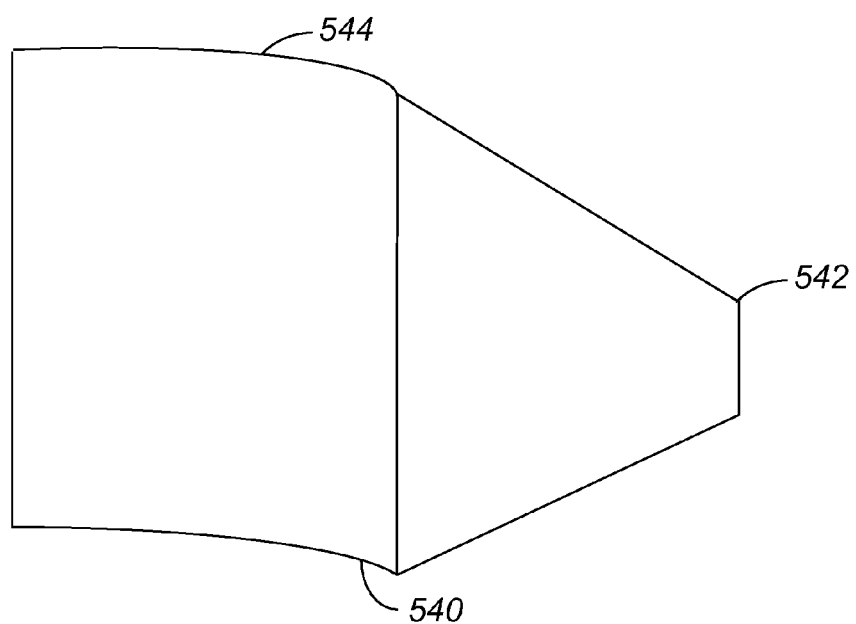
FIG. 5b is a diagrammatic representation of a portion of a wedge-shaped magnet, e.g., wedge magnet 414b of FIG. 4, in accordance with an embodiment of the present invention.
Figure 5B:
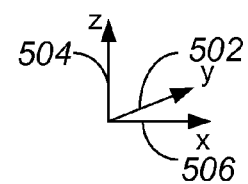

With reference to FIGS. 5a and 5b, the positioning and shapes of magnets associated with magnet array 406 will be described. FIG. 5a is a block diagram representation of magnet array 416 of FIG. 4 in accordance with an embodiment of the present invention. As previously described, magnet array 416 includes magnets 414a-e which may each, in one embodiment, be permanent magnets. Magnet 414c, which has a substantially rectangular cross-section, generally has a magnetic field direction that is substantially parallel to a y-axis 502, while magnets 414a, 414e, which are each shaped as a wedge, have magnetic field directions that are parallel to a z-axis 504. Magnets 414b, 414d, which are each also shaped as a wedge and have a non-rectangular, e.g., substantially trapezoidal, cross-section generally have associated magnetic field directions that are neither horizontal, e.g., parallel to y-axis 502, nor vertical, e.g., parallel to z-axis 504.

As shown, magnets 414a, 414b, 414d, 414e each have a non-rectangular cross-section, e.g., a substantially trapezoidal cross-section, at least in a plane that is defined by y-axis 502 and z-axis 504. Magnet 414c has a rectangular cross-section in the plane that is defined by y-axis 502 and z-axis 504.

The relative sizes of each magnet 414a-e within magnet array 416 may vary widely. It should be appreciated that the size and shape of each magnet 414a-e may also vary. By way of example, as shown in FIG. 5b, a portion 414b' of wedge 414b is shaped such that in a plane defined by y-axis 502 and z-axis 504, a cross-section of a wedge portion 414b' is approximately trapezoidal, whereas a cross-section of wedge portion 414b' in a plane defined by z-axis 504 and an x-axis 506 is substantially rectangular. Wedge portion 414b' has at least some edges, as for example edges 540, 542, 544, which have some curvature as wedge portion 414b' is a part of a wedge 414b which is effectively a wedge-shaped donut.

Figure 6:
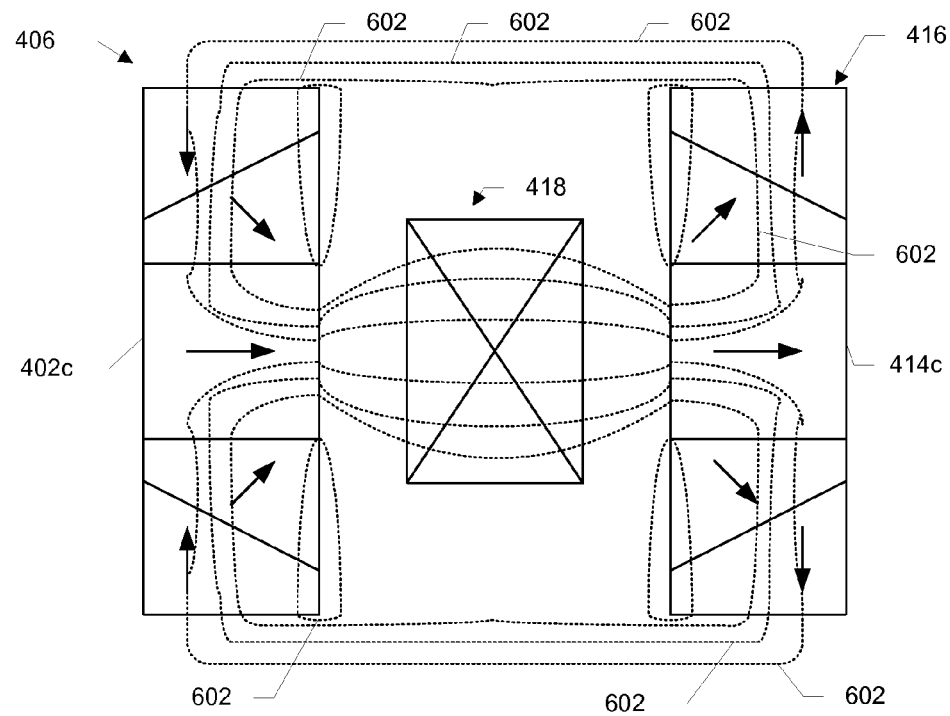
FIG. 6 is a representation of magnetic field equipotential lines associated with a coil and wedge Halbach magnet arrays, i.e., coil 418 and wedge Halbach magnet arrays 406, 416 of FIG. 4, in accordance with an embodiment of the present invention.

FIG. 6 is a representation of magnetic field equipotential lines associated with a coil and wedge Halbach magnet arrays, i.e., coil 418 and wedge Halbach magnet arrays 406, 416 of FIG. 4, in accordance with an embodiment of the present invention. As shown, equipotential or flux lines 602 are generally concentrated in the vicinity of coil 418. Equipotential lines may be arranged to pass substantially through a center of coil 418, and through magnet block 402c of magnet array 406 and through magnet block 414c of magnet array 416. It should be appreciated that only representative equipotential lines 602 have been shown for ease of illustration.

Figure 7:
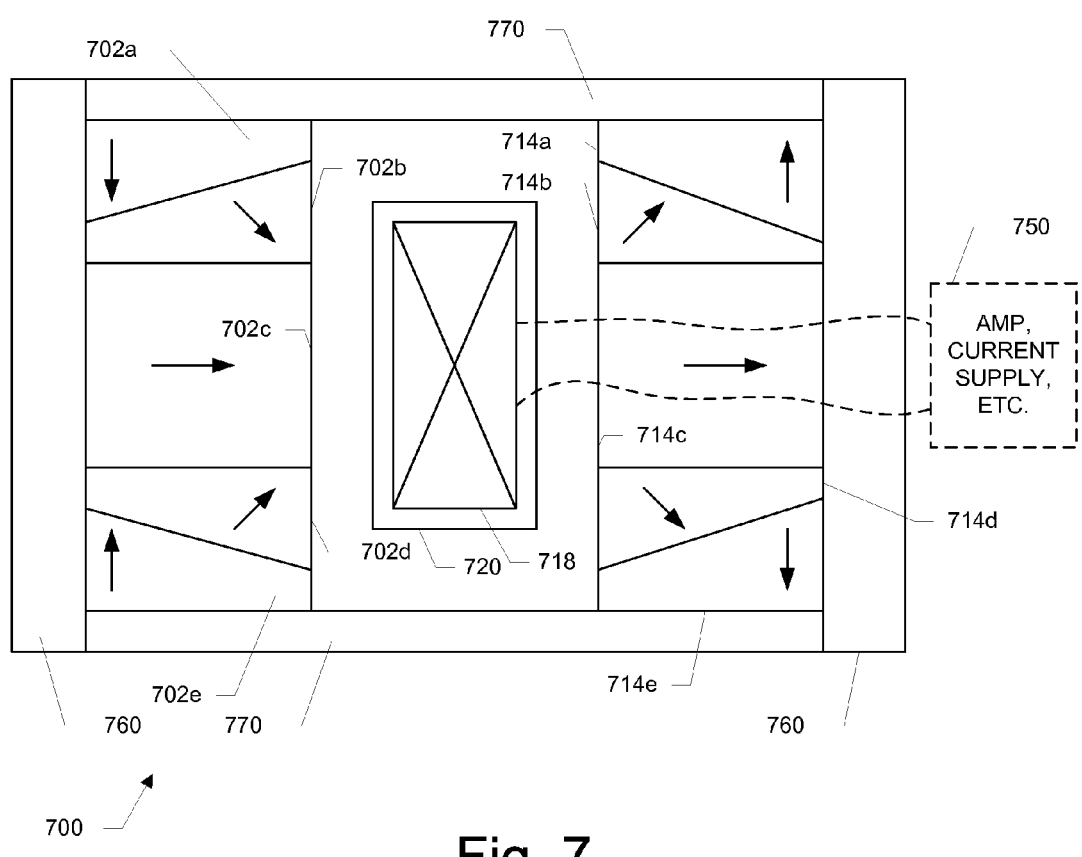
FIG. 7 is a cross-sectional block diagram representation of approximately half of a VCM which uses wedge Halbach arrays and a single coil in accordance with an embodiment of the present invention.

In general, equipotential lines 602 pass through a medium which allows flux to pass from magnet array 406 to magnet array 416, and vice versa. The medium that allows flux to pass between magnet array 406 and magnet array 416 is preferably a relatively high permeability magnetic medium, as for example magnetic steel. FIG. 7 is a cross-sectional block diagram representation of approximately half of a VCM which uses wedge Halbach arrays and a single coil in accordance with an embodiment of the present invention. A portion 700 of a VCM includes a coil 718, which is effectively shielded by a cooling can 720. In general, cooling can 720 may be formed from substantially any suitable material. Suitable materials include, but are not limited to, plastic, sheet metal, and carbon fiber. A coolant is typically provided within cooling can 720 such that coil 718, which has an overall hollow cylindrical shape, is surrounded by the coolant.

Flux is carried between "inner" magnets 702*a-e* and "outer" magnets 714*a-e*, e.g., from magnets 714*a-e* to magnets 702*a-e*, through magnetic material 770. Magnetic material 770 may be a material such as magnetic steel or iron. Typically, magnetic material 770 is arranged as plates which are substantially located on top and on the bottom of portion 700 to enable flux to "return" flux from magnets 714*a-e* to magnets 702*a-e*.

Coil 718 is powered by electronics 750 which often include components such as an amplifier and a current supply. In one embodiment, coil 718 is a single-phase coil. When current flows through coil 718, coil 718 moves relative to magnets 702*a-e*, 714*a-e* within a magnetic field associated with magnets 702*a-e*, 714*a-e*.

Since flux is conducted through magnets 702*a-e*, 714*a-e* and magnetic material 770 which form a magnetic circuit, sides 760 of portion 700 may be formed from a non-magnetic material. The non-magnetic material may generally be a material such as stainless steel, aluminum, ceramic, or plastic. Alternatively, sides 760 may be formed from a magnetic material.

Figure 8:
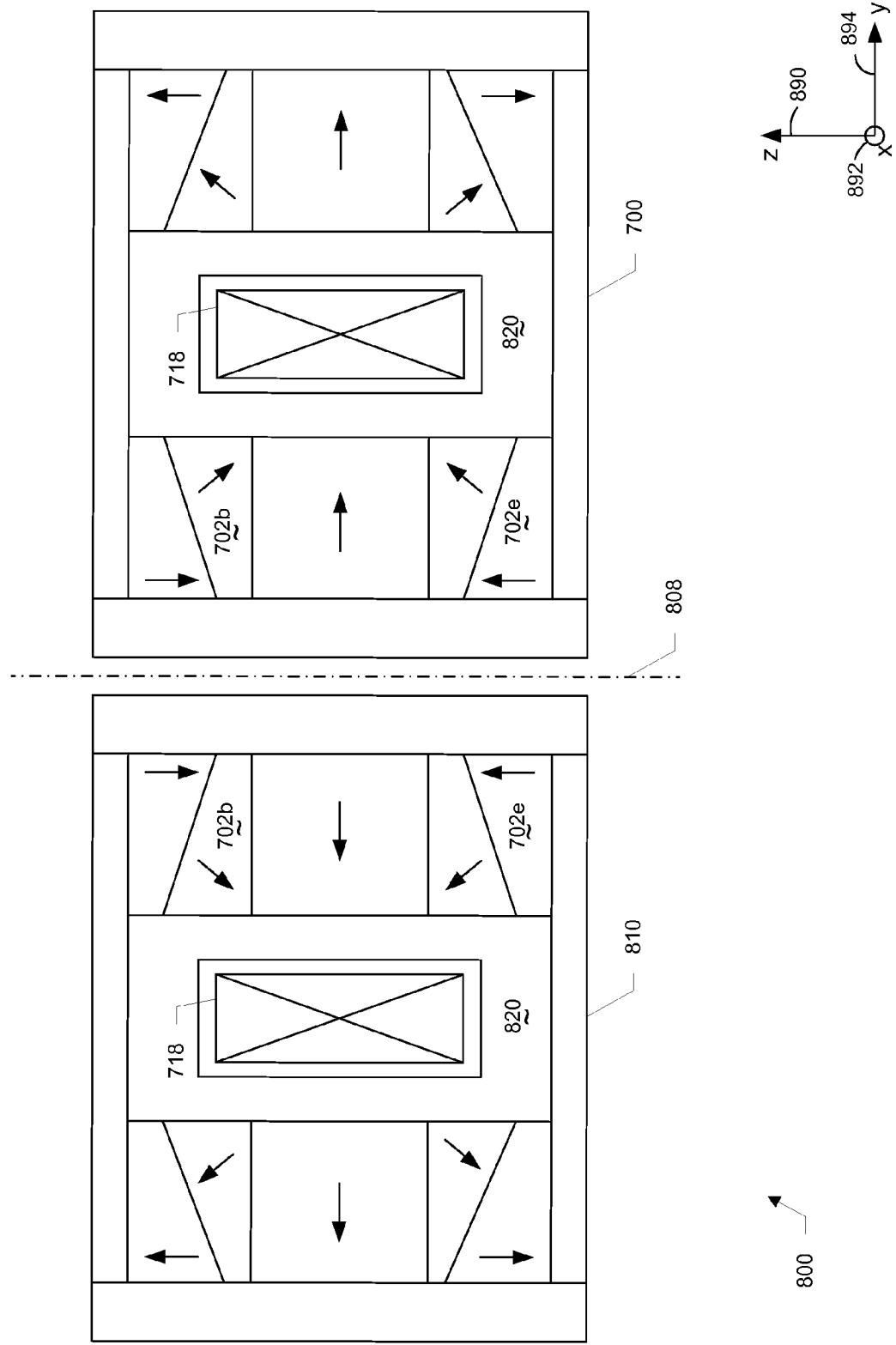
FIG. 8 is a cross-sectional block diagram representation of a VCM which uses wedge Halbach arrays and a single coil in accordance with an embodiment of the present invention.

As mentioned above, portion 700 is a part of a VCM. With reference to FIG. 8, a more complete cross-sectional representation of a VCM will be described in accordance with an embodiment of the present invention. A radially symmetric cylindrical VCM 800, which has a centerline 808 that is parallel to a z-axis 890, includes portion 700 of FIG. 7 as well as a portion 810, which is effectively a mirror image of portion 700. Coil 718 moves within space 820 and provides a force in a direction along z-axis 890, and is substantially positioned at a center of VCM 800. It should be appreciated that in addition to allowing movement along z-axis 890 and providing force in a direction along z-axis 890, VCM 800 may also permit a slight rotation about z-axis 890, a y-axis 894, or an x-axis 892, as well as slight movement in directions along x-axis 892 and y-axis 894.

Figure 9A:
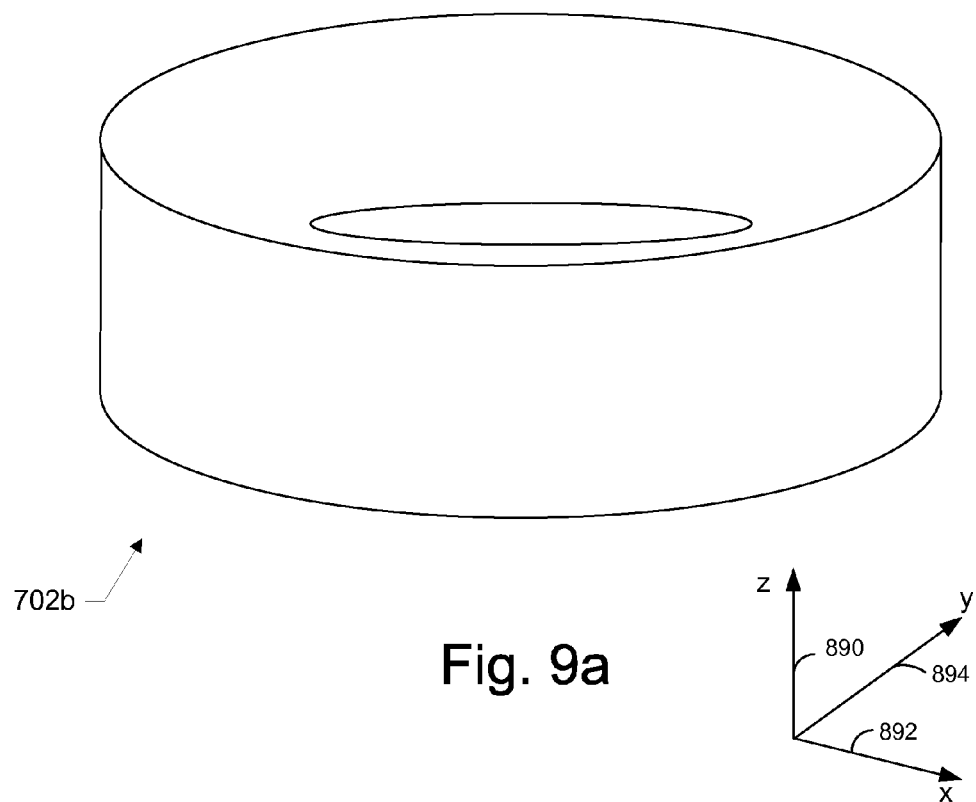
FIG. 9a is a diagrammatic representation of an overall wedge-shaped cylindrical magnet, e.g., magnet 702b of FIG. 7, in accordance with an embodiment of the present invention.
Figure 9B:
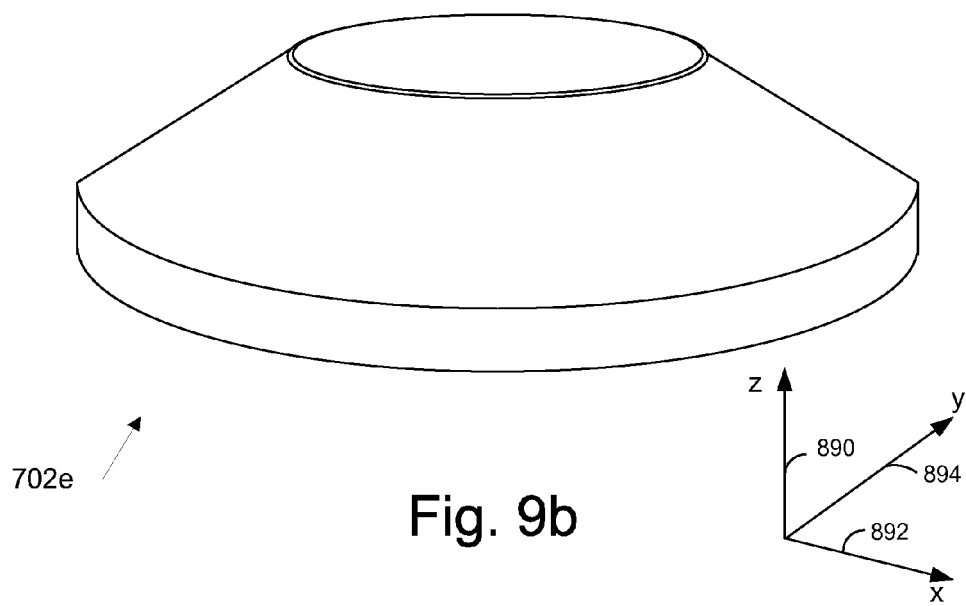
FIG. 9b is a diagrammatic representation of an overall wedge-shaped cylindrical magnet, e.g., magnet 702e of FIG. 7, in accordance with an embodiment of the present invention.

Magnets within VCM 800 are generally configured as block-shaped or wedge-shaped donuts. By way of example, wedge-shaped magnet 702*b* may generally have a donut shape as shown in FIG. 9*a*, whereas wedge-shaped magnet 702*e* may generally have a donut shape as shown in FIG. 9*b*. The donut shapes are of magnets 702*b*, 702*e* are such that the footprints of magnets 702*b*, 702*e*, taken with respect to a plane defined by x-axis 892 and y-axis 894, are substantially ring-like in shape.

Figure 10:
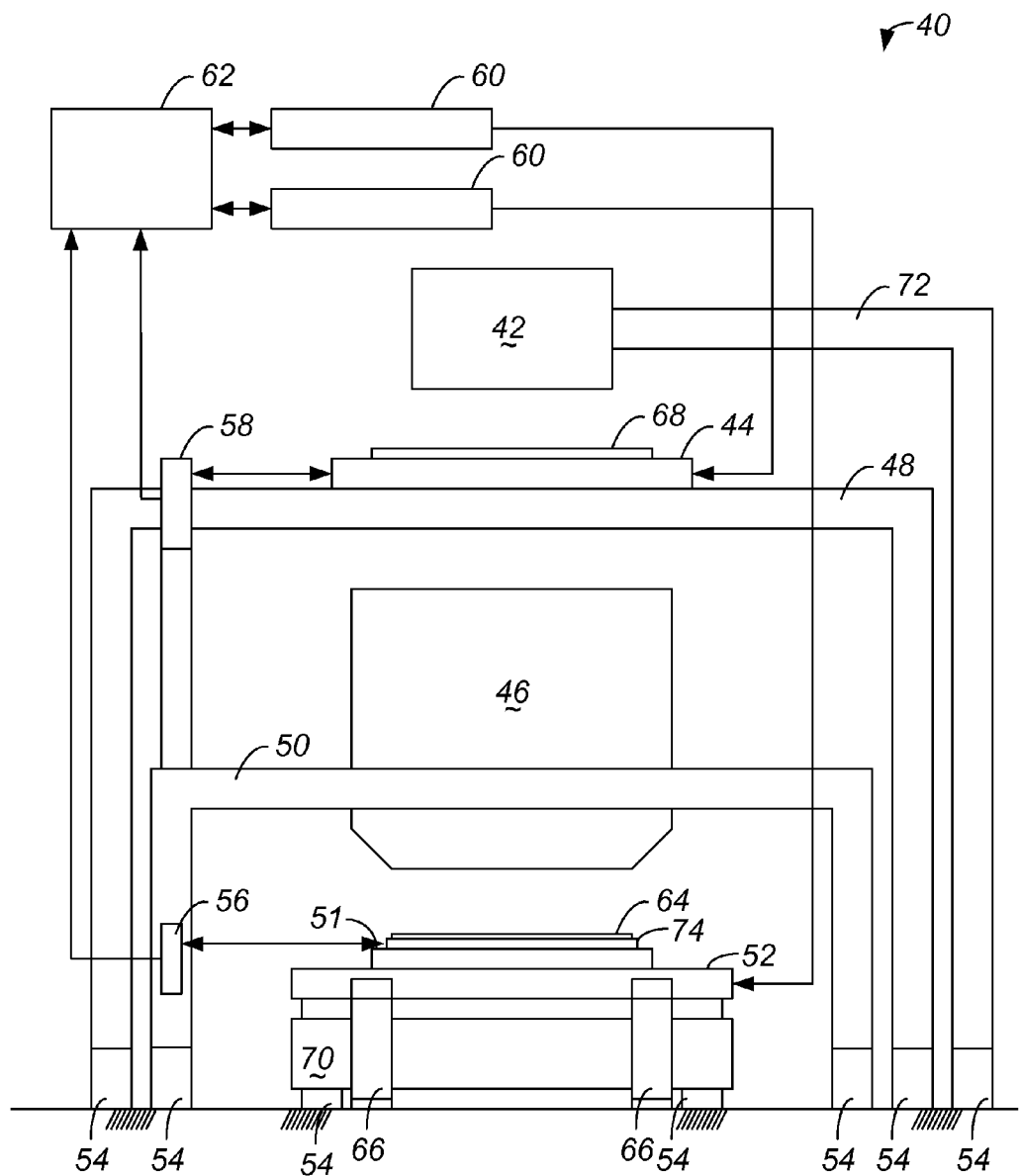
FIG. 10 is a diagrammatic representation of a photolithography apparatus in accordance with an embodiment of the present invention.

A VCM which utilizes a substantially cylindrical wedge Halbach array is suitable for a variety of different uses. By way of example, since the heat generated by such a VCM is not significant, and such a VCM provides a significant amount of force, such a VCM is particularly suitable for use as a component within a photolithography apparatus. Referring next to FIG. 10, a photolithography apparatus which may use a VCM with a substantially cylindrical wedge Halbach array will be described in accordance with an embodiment of the present invention. A photolithography apparatus (exposure apparatus) 40 includes a wafer positioning stage 52 that may be driven by a planar motor or linear motors (not shown), as well as a wafer table 51 that is coupled to wafer positioning stage 52 by utilizing an actuator spring or other means. The planar motor which drives wafer positioning stage 52 generally uses an electromagnetic force generated by magnets and corresponding armature coils. A wafer 64 is held in place on a wafer holder or chuck 74 which is coupled to wafer table 51. Wafer positioning stage 52 is arranged to move in multiple degrees of freedom, e.g., between one to six degrees of freedom, under the control of a control unit 60 and a system controller 62. The movement of wafer positioning stage 52 allows wafer 64 to be positioned at a desired position and orientation relative to a projection optical system 46.

Wafer table 51 may be levitated in a z-direction 10*b* by any number of VCMs (not shown), e.g., three voice coil motors. The VCMs may include substantially cylindrical wedge Halbach arrays. Optionally, at least one electromagnetic actuator (not shown) may couple and move wafer table 51 along an x-axis 10*c* or a y-axis 10*a*. The motor array of wafer positioning stage 52 is typically supported by a base 70. Base 70 is supported to a ground via isolators 54. Reaction forces generated by motion of wafer stage 52 may be mechanically released to a ground surface through a frame 66. One suitable frame 66 is described in JP Hei 8-166475 and U.S. Pat. No. 5,528,118, which are each herein incorporated by reference in their entireties.

An illumination system 42 is supported by a frame 72. Frame 72 is supported to the ground via isolators 54. Illumination system 42 includes an illumination source, and is arranged to project a radiant energy, e.g., light, through a mask pattern on a reticle 68 that is supported by and scanned using a reticle stage 44 which includes a coarse stage and a fine stage. The radiant energy is focused through projection optical system 46, which is supported on a projection optics frame 50 and may be supported the ground through isolators 54. Suitable isolators 54 include those described in JP Hei 8-330224 and U.S. Pat. No. 5,874,820, which are each incorporated herein by reference in their entireties.

A first interferometer 56 is supported on projection optics frame 50, and functions to detect the position of wafer table 51. Interferometer 56 outputs information on the position of wafer table 51 to system controller 62. A second interferometer 58 is supported on projection optics frame 50, and detects the position of reticle stage 44 which supports a reticle 68. Interferometer 58 also outputs position information to system controller 62.

It should be appreciated that there are a number of different types of photolithographic apparatuses or devices. For example, photolithography apparatus 40, or an exposure apparatus, may be used as a scanning type photolithography system which exposes the pattern from reticle 68 onto wafer 64 with reticle 68 and wafer 64 moving substantially synchronously. In a scanning type lithographic device, reticle 68 is moved perpendicularly with respect to an optical axis of a lens assembly (projection optical system 46) or illumination system 42 by reticle stage 44. Wafer 64 is moved perpendicularly to the optical axis of projection optical system 46 by a wafer stage 52. Scanning of reticle 68 and wafer 64 generally occurs while reticle 68 and wafer 64 are moving substantially synchronously.

Alternatively, photolithography apparatus or exposure apparatus 40 may be a step-and-repeat type photolithography system that exposes reticle 68 while reticle 68 and wafer 64 are stationary, i.e., at a substantially constant velocity of approximately zero meters per second. In one step and repeat process, wafer 64 is in a substantially constant position relative to reticle 68 and projection optical system 46 during the exposure of an individual field. Subsequently, between consecutive exposure steps, wafer 64 is consecutively moved by wafer positioning stage 52 perpendicularly to the optical axis of projection optical system 46 and reticle 68 for exposure. Following this process, the images on reticle 68 may be sequentially exposed onto the fields of wafer 64 so that the next field of semiconductor wafer 64 is brought into position relative to illumination system 42, reticle 68, and projection optical system 46.

It should be understood that the use of photolithography apparatus or exposure apparatus 40, as described above, is not limited to being used in a photolithography system for semiconductor manufacturing. For example, photolithography apparatus 40 may be used as a part of a liquid crystal display (LCD) photolithography system that exposes an LCD device pattern onto a rectangular glass plate or a photolithography system for manufacturing a thin film magnetic head. Photolithography apparatus 40 may also be used as a part of an immersion lithography system.

The present invention may be utilized in an immersion type exposure apparatus when suitable measures for a liquid are incorporated. By way of example, PCT patent application WO 99/49504, which is incorporated herein by reference in its entirety, discloses an exposure apparatus in which a liquid is supplied to a space between a substrate such as a wafer and a projection lens system in an exposure process.

Further, the present invention may be utilized in an exposure apparatus which includes two or more substrates and/or reticle stages. In such an apparatus, the additional stage may be used in parallel or preparatory steps while the other stage may be used for exposing. Exemplary multiple stage exposure apparatuses are described, for example, in Japan patent Application Disclosure No. 10-163099, as well as in Japan patent Application Disclosure No. 10-214783 and its counterparts U.S. Pat. No. 6,341,007, U.S. Pat. No. 6,400,441, U.S. Pat. No. 6,549,269, and U.S. Pat. No. 6,590,634. Each of these references is herein incorporated by reference in its entirety. Other exemplary multiple stage exposure apparatuses are described in Japan patent Application Disclosure No. 2000-505958, as well as in U.S. Pat. No. 5,969,441 and U.S. Pat. No. 6,208,407. Each of these references is herein incorporated by reference in its entirety The present invention may also be utilized in an exposure apparatus that has a movable stage which retains a substrate, e.g., a wafer, for exposure, and a stage having various sensor or measurement tools for measuring, as described in Japan patent Disclosure No. 11-135400. As far as is permitted, the disclosure of Japan patent Disclosure No. 11-135400 is incorporated herein by reference in its entirety.

In addition, the present invention may be utilized in an exposure apparatus that is operated in a vacuum environment. It should be appreciated that suitable measures may need to be incorporated to the present invention to accommodate a vacuum environment for the air, or fluid, bearing arrangements. Such an exposure apparatus may be, but is not limited to being, an EB type exposure apparatus, or an EUVL type exposure apparatus.

The illumination source of illumination system 42 may be g-line (436 nanometers (nm)), i-line (365 nm), a KrF excimer laser (248 nm), an ArF excimer laser (193 nm), and an $F_2$-type laser (157 nm). Alternatively, illumination system 42 may also use charged particle beams such as x-ray and electron beams. For instance, in the case where an electron beam is used, thermionic emission type lanthanum hexaboride ($LaB_6$) or tantalum (Ta) may be used as an electron gun. Furthermore, in the case where an electron beam is used, the structure may be such that either a mask is used or a pattern may be directly formed on a substrate without the use of a mask.

With respect to projection optical system 46, when far ultra-violet rays such as an excimer laser is used, glass materials such as quartz and fluorite that transmit far ultra-violet rays is preferably used. When either an $F_2$-type laser or an x-ray is used, projection optical system 46 may be either catadioptric or refractive (a reticle may be of a corresponding reflective type), and when an electron beam is used, electron optics may comprise electron lenses and deflectors. As will be appreciated by those skilled in the art, the optical path for the electron beams is generally in a vacuum.

In addition, with an exposure device that employs vacuum ultra-violet (VUV) radiation of a wavelength that is approximately 200 nm or lower, use of a catadioptric type optical system may be considered. Examples of a catadioptric type of optical system include, but are not limited to, those described in Japan Patent Application Disclosure No. 8-171054 published in the Official gazette for Laid-Open Patent Applications and its counterpart U.S. Pat. No. 5,668,672, as well as in Japan Patent Application Disclosure No. 10-20195 and its counterpart U.S. Pat. No. 5,835,275, which are all incorporated herein by reference in their entireties. In these examples, the reflecting optical device may be a catadioptric optical system incorporating a beam splitter and a concave mirror. Japan Patent Application Disclosure (Hei) No. 8-334695 published in the Official gazette for Laid-Open Patent Applications and its counterpart U.S. Pat. No. 5,689,377, as well as Japan Patent Application Disclosure No. 10-3039 and its counterpart U.S. Pat. No. 5,892,117, which are all incorporated herein by reference in their entireties. These examples describe a reflecting-refracting type of optical system that incorporates a concave mirror, but without a beam splitter, and may also be suitable for use with the present invention.

Further, in photolithography systems, when linear motors (see U.S. Pat. No. 5,623,853 or 5,528,118, which are each incorporated herein by reference in their entireties) are used in a wafer stage or a reticle stage, the linear motors may be either an air levitation type that employs air bearings or a magnetic levitation type that uses Lorentz forces or reactance forces. Additionally, the stage may also move along a guide, or may be a guideless type stage which uses no guide.

Alternatively, a wafer stage or a reticle stage may be driven by a planar motor which drives a stage through the use of electromagnetic forces generated by a magnet unit that has magnets arranged in two dimensions and an armature coil unit that has coil in facing positions in two dimensions. With this type of drive system, one of the magnet unit or the armature coil unit is connected to the stage, while the other is mounted on the moving plane side of the stage.

Movement of the stages as described above generates reaction forces which may affect performance of an overall photolithography system. Reaction forces generated by the wafer (substrate) stage motion may be mechanically released to the floor or ground by use of a frame member as described above, as well as in U.S. Pat. No. 5,528,118 and published Japanese Patent Application Disclosure No. 8-166475. Additionally, reaction forces generated by the reticle (mask) stage motion may be mechanically released to the floor (ground) by use of a frame member as described in U.S. Pat. No. 5,874,820 and published Japanese Patent Application Disclosure No. 8-330224, which are each incorporated herein by reference in their entireties.

Isolaters such as isolators 54 may generally be associated with an active vibration isolation system (AVIS). An AVIS generally controls vibrations associated with forces 112, i.e., vibrational forces, which are experienced by a stage assembly or, more generally, by a photolithography machine such as photolithography apparatus 40 which includes a stage assembly.

A photolithography system according to the above-described embodiments, e.g., a photolithography apparatus which may include one or more dual force actuators, may be built by assembling various subsystems in such a manner that prescribed mechanical accuracy, electrical accuracy, and optical accuracy are maintained. In order to maintain the various accuracies, prior to and following assembly, substantially every optical system may be adjusted to achieve its optical accuracy. Similarly, substantially every mechanical system and substantially every electrical system may be adjusted to achieve their respective desired mechanical and electrical accuracies. The process of assembling each subsystem into a photolithography system includes, but is not limited to, developing mechanical interfaces, electrical circuit wiring connections, and air pressure plumbing connections between each subsystem. There is also a process where each subsystem is assembled prior to assembling a photolithography system from the various subsystems. Once a photolithography system is assembled using the various subsystems, an overall adjustment is generally performed to ensure that substantially every desired accuracy is maintained within the overall photolithography system. Additionally, it may be desirable to manufacture an exposure system in a clean room where the temperature and humidity are controlled.

Figure 11:
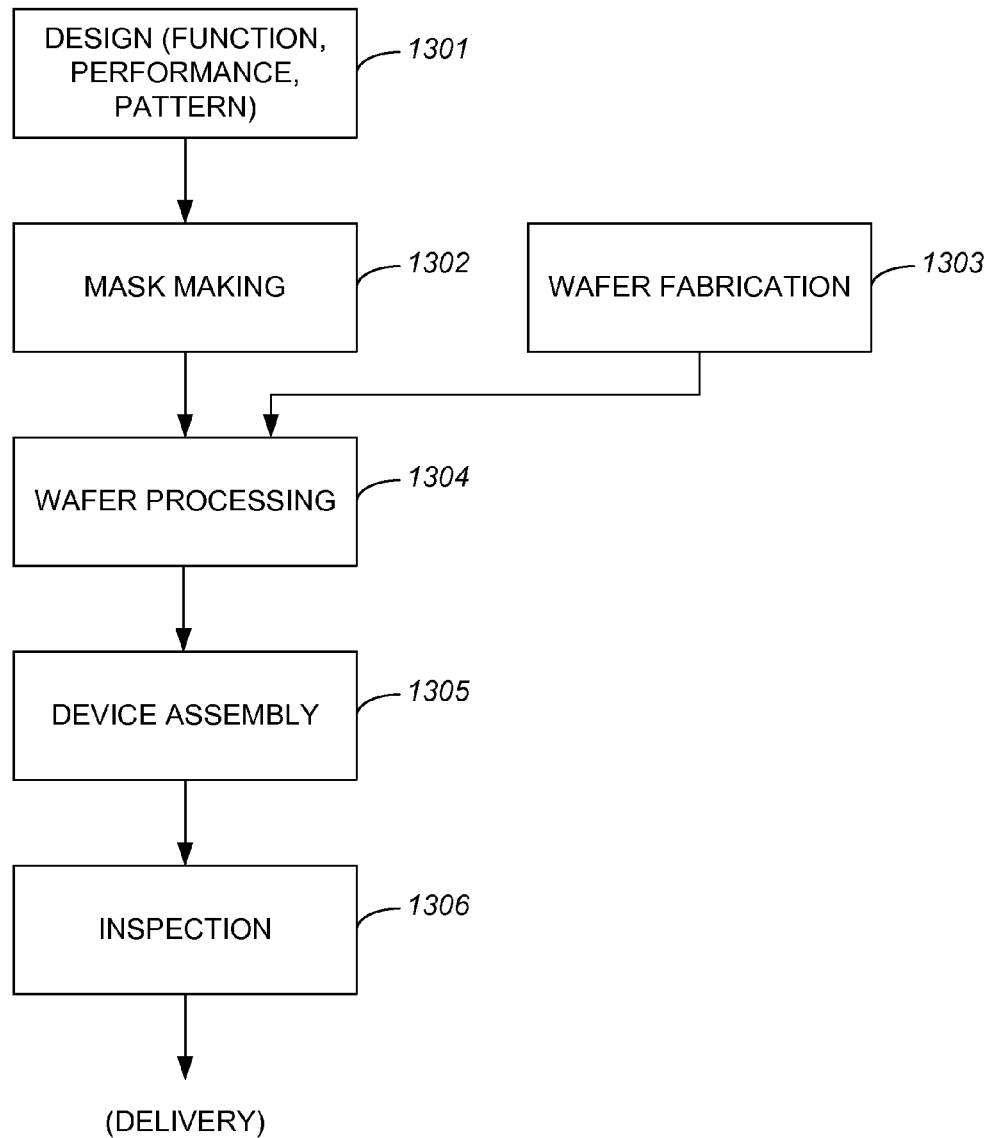
FIG. 11 is a process flow diagram which illustrates the steps associated with fabricating a semiconductor device in accordance with an embodiment of the present invention.

Further, semiconductor devices may be fabricated using systems described above, as will be discussed with reference to FIG. 11. The process begins at step 1301 in which the function and performance characteristics of a semiconductor device are designed or otherwise determined. Next, in step 1302, a reticle (mask) in which has a pattern is designed based upon the design of the semiconductor device. It should be appreciated that in a parallel step 1303, a wafer is made from a silicon material. The mask pattern designed in step 1302 is exposed onto the wafer fabricated in step 1303 in step 1304 by a photolithography system. One process of exposing a mask pattern onto a wafer will be described below with respect to FIG. 12. In step 1305, the semiconductor device is assembled. The assembly of the semiconductor device generally includes, but is not limited to, wafer dicing processes, bonding processes, and packaging processes. Finally, the completed device is inspected in step 1306.

Figure 12:
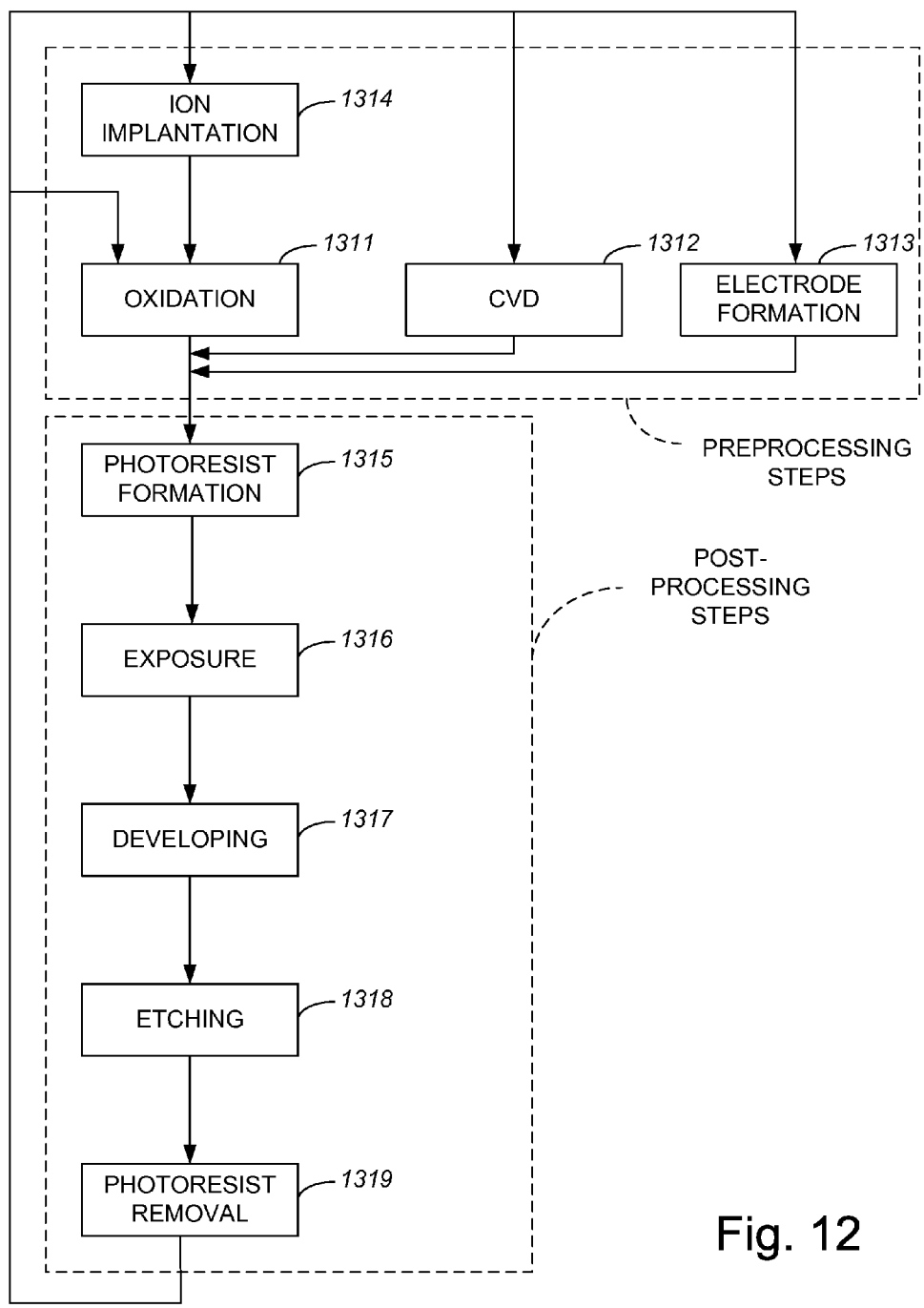
FIG. 12 is a process flow diagram which illustrates the steps associated with processing a wafer, i.e., step 1304 of FIG. 11, in accordance with an embodiment of the present invention.

FIG. 12 is a process flow diagram which illustrates the steps associated with wafer processing in the case of fabricating semiconductor devices in accordance with an embodiment of the present invention. In step 1311, the surface of a wafer is oxidized. Then, in step 1312 which is a chemical vapor deposition (CVD) step, an insulation film may be formed on the wafer surface. Once the insulation film is formed, in step 1313, electrodes are formed on the wafer by vapor deposition. Then, ions may be implanted in the wafer using substantially any suitable method in step 1314. As will be appreciated by those skilled in the art, steps 1311-1314 are generally considered to be preprocessing steps for wafers during wafer processing. Further, it should be understood that selections made in each step, e.g., the concentration of various chemicals to use in forming an insulation film in step 1312, may be made based upon processing requirements.

At each stage of wafer processing, when preprocessing steps have been completed, post-processing steps may be implemented. During post-processing, initially, in step 1315, photoresist is applied to a wafer. Then, in step 1316, an exposure device may be used to transfer the circuit pattern of a reticle to a wafer. Transferring the circuit pattern of the reticle of the wafer generally includes scanning a reticle scanning stage which may, in one embodiment, include a force damper to dampen vibrations.

After the circuit pattern on a reticle is transferred to a wafer, the exposed wafer is developed in step 1317. Once the exposed wafer is developed, parts other than residual photoresist, e.g., the exposed material surface, may be removed by etching. Finally, in step 1319, any unnecessary photoresist that remains after etching may be removed. As will be appreciated by those skilled in the art, multiple circuit patterns may be formed through the repetition of the preprocessing and post-processing steps.

Although only a few embodiments of the present invention have been described, it should be understood that the present invention may be embodied in many other specific forms without departing from the spirit or the scope of the present invention. By way of example, while the use of a single coil has been described as being suitable for use with a cylindrical wedge Halbach array with wedge-shaped magnets at the ends of the array, it should be appreciated that more than a single coil may also be used with such an array. In one embodiment, two coils may be used in lieu of a single coil.

While the use of a wedge Halbach array of magnets has been described in terms of being used in a cylindrical VCM, it should be appreciated that an array of magnets which includes at least one wedge-shaped magnet may be used within a variety of different VCMs. In one embodiment, a VCM which utilizes a coil which is substantially shaped as a square tube may utilize arrays of magnets which have an overall rectangular block shape with at least one component magnet being wedge-shaped.

A VCM may include substantially only a single magnet array with at least one wedge-shaped component magnet. By way of example, an inner magnet ring of a radially symmetric cylindrical VCM may include at least one wedge-shaped component magnet, while an outer magnet ring of the VCM may be formed as a substantially uniform donut-shaped magnet, or may include only component magnets which are not wedge-shaped. Alternatively, an outer magnet ring of a radially symmetric cylindrical VCM may include at least one wedge-shaped component magnet, and an inner magnet ring of the VCM may include a substantially uniform donut-shaped magnet, or may include only component magnets which are not wedge-shaped.

The parameters associated with a coil that is used in a radially symmetric cylindrical VCM with a cylindrical wedge Halbach array that includes wedge-shaped magnets at the ends of the array may vary widely. By way of example, both the number of turns in a coil as well as the gauge of the wire in the coil may vary. That is, the coil geometry may vary. Typically, as the wire gauge increases, the number of turns in a coil increases, and the resistance associated with the coil increases. Since the force generated by a VCM is proportional to the amount of current and the number of turns in a coil, to maintain the same force with lower current, the number of turns in the coil is increased. However, the voltage provided to the coil is generally increased in order to provide the same electric power, since power is proportional to both current and voltage. As the efficiency of a VCM is dependent upon the orientation of magnets within the VCM and not the number of turns in a coil or the wire gauge associated with the coil, the wire gauge may be selected such that the voltage and the current requirements of the VCM are consistent with any requirements of an amplifier or other electronics associated with the VCM.

In addition to coil-related parameters, other parameters associated with a VCM in accordance with the present invention may also be widely varied. For instance, the inner and outer radii of the magnets in a cylindrical wedge Halbach array may vary. The positioning of the coil within a VCM may also be varied depending upon the requirements of a particular system. For example, the radial clearance or gap between a magnet array and the coil may vary depending upon the length of a trajectory stroke, such as a stroke in an XY plane, and a maximum stage position error, among other factors.

Since many magnets, e.g., NdFeB magnets, are anisotropic, it is often preferable to fabricate each radially magnetized ring magnet out of several sections. By way of example, approximately six magnet sections may be used to form a single ring magnet. Generally, the number of magnets included in a wedge Halbach array may vary. In other words, although each wedge Halbach array described above has been described as including five or six magnets, a wedge Halbach array may include fewer or more magnets without departing from the spirit or the scope of the present invention. Therefore, the present examples are to be considered as illustrative and not restrictive, and the invention is not to be limited to the details given herein, but may be modified within the scope of the appended claims.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A voice coil motor (VCM) comprising:
a first magnet arrangement, the first magnet arrangement including at least a first magnet and a second magnet, at least one of the first magnet and the second magnet having a cross-section that is non-rectangular with respect to a plane, wherein the first magnet is arranged substantially at a center of the first magnet arrangement and the first magnet and the second magnet are arranged to be in contact;
a second magnet arrangement, the second magnet arrangement including at least a third magnet and a fourth magnet, at least one of the third magnet and the fourth magnet having a cross-section that is non-rectangular with respect to the plane, wherein the third magnet is arranged substantially at a center of the second magnet arrangement and the third magnet and the fourth magnet are arranged to be in contact, wherein at least one of the first magnet arrangement and the second magnet arrangement has a hollow cylindrical shape;
a coil arrangement, the coil arrangement being at least partially positioned between the first magnet arrangement and the second magnetic arrangement, the coil arrangement being arranged to receive current to cause the coil arrangement to generate force relative to the first magnet arrangement and the second magnet arrangement; and
a flux return, the flux return being arranged to carry flux between the first magnet arrangement and the second magnet arrangement.

2. A voice coil motor (VCM) comprising:
a first magnet arrangement, the first magnet arrangement including at least a first magnet and a second magnet, at least one of the first magnet and the second magnet having a cross-section that is non-rectangular with respect to a plane, wherein the first magnet is arranged substantially at a center of the first magnet arrangement and the first magnet and the second magnet are arranged to be in contact;
a second magnet arrangement, the second magnet arrangement including at least a third magnet and a fourth magnet, at least one of the third magnet and the fourth magnet having a cross-section that is non-rectangular with respect to the plane, wherein the third magnet is arranged substantially at a center of the second magnet arrangement and the third magnet and the fourth magnet are arranged to be in contact;
a coil arrangement, the coil arrangement being at least partially positioned between the first magnet arrangement and the second magnetic arrangement, the coil arrangement being arranged to receive current to cause the coil arrangement to generate force relative to the first magnet arrangement and the second magnet arrangement; and
at least one plate, the at least one plate being formed from a magnetic material, wherein the at least one plate is arranged to be in physical contact with both the first magnet arrangement and the second magnet arrangement.

3. The VCM of claim 2 wherein the second magnet having the cross-section that is non-rectangular has one of a trapezoidal cross-section and a triangular cross-section, and the fourth magnet having the cross-section that is non-rectangular has one of a trapezoidal cross-section and a triangular cross-section.

4. The VCM of claim 2 wherein the coil arrangement includes a single-phase coil.

5. The VCM of claim 4 wherein the coil arrangement includes only the single-phase coil, a cooling can arranged around the coil, and a coolant.

6. The VCM of claim 2 wherein the first magnet arrangement is a Halbach array and the second magnet arrangement is a Halbach array.

7. A voice coil motor (VCM) comprising:
a first magnet arrangement, the first magnet arrangement including a first plurality of magnets, the first plurality of magnets each having a cross-section that is non-rectangular;
a second magnet arrangement, the second magnet arrangement including a second plurality of magnets, the second plurality of magnets each having a cross-section that is non-rectangular, wherein the first magnet arrangement and the second magnet arrangement are arranged to cooperate to generate a magnetic field, wherein at least one of the first magnet arrangement and the second magnet arrangement has a hollow cylindrical shape;
a coil arrangement, the coil arrangement being at least partially positioned between the first magnet arrangement and the second magnet arrangement, the coil arrangement being arranged to receive current to cause the coil arrangement to generate force relative to the first magnet arrangement and the second magnet arrangement; and
a flux return, the flux return being arranged to carry flux between the first magnet arrangement and the second magnet arrangement.

8. The VCM of claim 7 wherein the coil arrangement includes a plurality of coils.

9. The VCM of claim 7 wherein the coil arrangement includes a single-phase coil.

10. The VCM of claim 7 wherein the first magnet arrangement is a Halbach array and the second magnet arrangement is a Halbach array.

11. A stage apparatus comprising the VCM of claim 7.

12. A lithography apparatus comprising the stage apparatus of claim 11.

13. A device manufactured with the lithography apparatus of claim 12.

14. A wafer on which an image has been formed by the lithography apparatus of claim 12.

15. A voice coil motor (VCM) comprising:
a first magnet arrangement, the first magnet arrangement including a first plurality of magnets, the first plurality of magnets each having a cross-section that is non-rectangular;
a second magnet arrangement, the second magnet arrangement including a second plurality of magnets, the second plurality of magnets each having a cross-section that is non-rectangular, wherein the first magnet arrangement and the second magnet arrangement are arranged to cooperate to generate a magnetic field;
a coil arrangement, the coil arrangement being at least partially positioned between the first magnet arrangement and the second magnet arrangement, the coil arrangement being arranged to receive current to cause the coil arrangement to generate force relative to the first magnet arrangement and the second magnet arrangement, wherein the first magnet arrangement has an overall hollow cylindrical shape and the second magnet arrangement has an overall hollow cylindrical shape, and the first magnet arrangement is arranged to be positioned within a space defined within the second magnet arrangement; and
a flux return, the flux return being arranged to carry flux between the first magnet arrangement and the second magnet arrangement.

16. A voice coil motor (VCM) comprising:
a first magnet arrangement, the first magnet arrangement including a first plurality of magnets, the first plurality of magnets each having a cross-section that is non-rectangular;
a second magnet arrangement, the second magnet arrangement including a second plurality of magnets, the second plurality of magnets each having a cross-section that is non-rectangular, wherein the first magnet arrangement and the second magnet arrangement are arranged to cooperate to generate a magnetic field; and
a coil arrangement, the coil arrangement being at least partially positioned between the first magnet arrangement and the second magnet arrangement, the coil arrangement being arranged to receive current to cause the coil arrangement to generate force relative to the first magnet arrangement and the second magnet arrangement, wherein each magnet of the first plurality of magnets has a triangular cross-section and each magnet of the second plurality of magnets has a triangular cross-section.

17. A voice coil motor (VCM) comprising:
a first magnet arrangement, the first magnet arrangement including a first plurality of magnets, the first plurality of magnets each having a cross-section that is non-rectangular;
a second magnet arrangement, the second magnet arrangement including a second plurality of magnets, the second plurality of magnets each having a cross-section that is non-rectangular, wherein the first magnet arrangement and the second magnet arrangement are arranged to cooperate to generate a magnetic field; and
a coil arrangement, the coil arrangement being at least partially positioned between the first magnet arrangement and the second magnet arrangement, the coil arrangement being arranged to receive current to cause the coil arrangement to generate force relative to the first magnet arrangement and the second magnet arrangement, wherein at least one magnet of the first plurality of magnets has a triangular cross-section and an overall wedge, donut shape, and wherein at least one magnet of the second plurality of magnets has a triangular cross-section and an overall wedge, donut shape.

18. A voice coil motor (VCM) comprising:
a first magnet arrangement, the first magnet arrangement including at least a first magnet and a second magnet, at least one of the first magnet and the second magnet having a cross-section that is non-rectangular with respect to a plane, wherein the first magnet is arranged substantially at a center of the first magnet arrangement and the first magnet and the second magnet are arranged to be in contact;
a second magnet arrangement, wherein at least one of the first magnet arrangement and the second magnet arrangement has a hollow cylindrical shape;
a coil arrangement, the coil arrangement being at least partially positioned between the first magnet arrangement and the second magnet arrangement, the coil arrangement being arranged to receive current to cause the coil arrangement to generate force relative to the first magnet arrangement and the second magnet arrangement; and
a flux return, the flux return being arranged to carry flux between the first magnet arrangement and the second magnet arrangement.

19. The VCM of claim 18 wherein the second magnet having the cross-section that is non-rectangular has one of a trapezoidal cross-section and a triangular cross-section.

20. The VCM of claim 18 wherein the coil arrangement includes a single-phase coil.

21. The VCM of claim 20 wherein the coil arrangement includes only the single-phase coil, a cooling can arranged around the coil, and a coolant.

22. The VCM of claim 18 wherein the first magnet arrangement is a Halbach array.

23. A stage apparatus comprising the VCM of claim 18.

24. A lithography apparatus comprising the stage apparatus of claim 23.

25. A device manufactured with the lithography apparatus of claim 24.

26. A wafer on which an image has been formed by the lithography apparatus of claim 24.

27. A voice coil motor (VCM) comprising:
a first magnet arrangement, the first magnet arrangement including at least a first magnet and a second magnet, at least one of the first magnet and the second magnet having a cross-section that is non-rectangular with respect to a plane, wherein the first magnet is arranged substantially at a center of the first magnet arrangement and the first magnet and the second magnet are arranged to be in contact;
a second magnet arrangement;
a coil arrangement, the coil arrangement being at least partially positioned between the first magnet arrangement and the second magnet arrangement, the coil arrangement being arranged to receive current to cause the coil arrangement to generate force relative to the first magnet arrangement and the second magnet arrangement; and
at least one plate, the at least one plate being formed from a magnetic material, wherein the at least one plate is arranged to be in physical contact with both the first magnet arrangement and the second magnet arrangement.

* * * * *

UNITED STATES PATENT AND TRADEMARK OFFICE
CERTIFICATE OF CORRECTION

| | |
|---|---|
| PATENT NO. | : 8,212,435 B2 |
| APPLICATION NO. | : 12/050669 |
| DATED | : July 3, 2012 |
| INVENTOR(S) | : Michael B. Binnard, Jean-Marc Gery and Andrew J. Hazelton |

Page 1 of 1

It is certified that error appears in the above-identified patent and that said Letters Patent is hereby corrected as shown below:

IN THE TITLE PAGE:

under Item (75) Inventors:

"Michael B. Binnard, Belmont, CA (US), Jean-Marc Gery, Los Angeles, CA (US)"

should be:

--Michael B. Binnard, Belmont, CA (US), Jean-Marc Gery, Los Angeles, CA (US), Andrew J. Hazelton, Yokohama, JAPAN--

Signed and Sealed this
Eighteenth Day of December, 2012

David J. Kappos
*Director of the United States Patent and Trademark Office*